US012372617B1

(12) United States Patent
Verplaetse et al.

(10) Patent No.: US 12,372,617 B1
(45) Date of Patent: Jul. 29, 2025

(54) METHODS FOR MAPPING AN ENVIRONMENT AND RELATED DEVICES

(71) Applicant: Apple Inc., Cupertino, CA (US)

(72) Inventors: Christopher J. Verplaetse, San Francisco, CA (US); Philip K. Reyneri, San Francisco, CA (US)

(73) Assignee: APPLE INC., Cupertino, CA (US)

( * ) Notice: Subject to any disclaimer, the term of this patent is extended or adjusted under 35 U.S.C. 154(b) by 328 days.

(21) Appl. No.: 18/066,727

(22) Filed: Dec. 15, 2022

Related U.S. Application Data

(60) Provisional application No. 63/267,831, filed on Feb. 10, 2022.

(51) Int. Cl.
*G01S 7/48* (2006.01)
*G01S 5/00* (2006.01)

(52) U.S. Cl.
CPC ............. *G01S 7/4808* (2013.01); *G01S 5/011* (2020.05)

(58) Field of Classification Search
CPC ................................ G01S 7/4808; G01S 5/011
See application file for complete search history.

(56) References Cited

U.S. PATENT DOCUMENTS

| | | | | |
|---|---|---|---|---|
| 8,433,337 | B2* | 4/2013 | Chin | H04W 64/00 455/457 |
| 10,356,553 | B2* | 7/2019 | Sant | H04W 64/003 |
| 11,026,048 | B1* | 6/2021 | Ebner | H04W 4/026 |
| 11,601,779 | B2* | 3/2023 | Sant | G01S 5/017 |
| 11,614,716 | B2* | 3/2023 | Liang | H04R 1/04 368/10 |
| 11,625,857 | B1* | 4/2023 | Lipski | G06T 7/251 345/659 |
| 2012/0321112 | A1* | 12/2012 | Schubert | H04R 25/43 381/312 |
| 2013/0317944 | A1* | 11/2013 | Huang | G01S 5/02521 455/457 |
| 2014/0114561 | A1* | 4/2014 | Pakzad | G01C 22/006 701/410 |
| 2015/0234033 | A1* | 8/2015 | Jamieson | G01S 3/12 455/456.1 |
| 2018/0041868 | A1* | 2/2018 | Gunnarsson | G01S 5/0036 |
| 2018/0091952 | A1* | 3/2018 | Sant | G01S 5/017 |
| 2020/0264006 | A1* | 8/2020 | Sommer | H04S 7/304 |

* cited by examiner

*Primary Examiner* — Mussa A Shaawat
(74) *Attorney, Agent, or Firm* — Dorsey & Whitney LLP

(57) ABSTRACT

One or more electronic devices can map an environment based on movement or location data of the one or more electronic devices within the environment. The data can be analyzed, processed, or otherwise relied on to generate a path along which one or more of the electronic devices were carried (e.g., by a user) or located at given time over the duration of time. The path and attributes related to the environment can be analyzed (e.g., using machine learning techniques) to generate a topological or other type of map of the environment.

20 Claims, 5 Drawing Sheets

METHODS FOR MAPPING AN ENVIRONMENT AND RELATED DEVICES

CROSS-REFERENCE TO RELATED APPLICATION(S)

This application claims priority to U.S. Provisional Patent Application No. 63/267,831, filed 10 Feb. 2022, and entitled "METHODS FOR MAPPING AN ENVIRONMENT AND RELATED DEVICES," the entire disclosure of which is hereby incorporated by reference.

FIELD

The described embodiments relate generally to electronic devices. More particularly, the present embodiments relate to mapping an environment using one or more electronic devices.

BACKGROUND

Electronic devices are increasingly being designed with device portability in mind, for example, to allow users to use these devices in a wide variety of situations and environments. Indeed, power sources, such as lithium batteries, can power an electronic device for a substantial duration of time and in a variety of indoor and outdoor environments. Components within an electronic device, such as, a processor, memory, antennas, and other components, can be disposed within a portable housing to protect the components from damage or failure induced by an environment external to the housing. Improvements and advances to portable electronic devices can be desirable to provide additional functionality in a variety of situations and environments.

SUMMARY

An aspect of the present disclosure relates to a portable electronic device including a sensor configured to detect a first location of the portable electronic device within an environment at a first instance of time. The sensor is further configured to detect a second location of the portable electronic device within the environment at a second instance of time. The portable electronic device further includes a processor configured to generate a path based on the first location and the second location, the path associated with movement of the portable electronic device within the environment. The processor is further configured to generate a map of the environment based at least partially on the path.

In some examples, the portable electronic device can be a smart phone, a smart watch, or a tablet computing device. The map of the environment can be a topological map. The portable electronic device can be a first electronic device including a wireless communication module, such as an antenna, configured to receive location data from a second electronic device. The path generated by the processor can be at least partially based on the location data received from the second electronic device. The portable electronic device can be a first portable electronic device and the second electronic device can be a second portable electronic device disposed within the environment. The second electronic device can be a stationary electronic device disposed within the environment. The processor can be configured to generate the map when an input is received by a user of the portable electronic device.

Another aspect of the present disclosure relates to a portable electronic device including a sensor configured to detect movement of the portable electronic device within an environment. The portable electronic device includes a processor configured to generate a path based on the movement. The processor is further configured to generate a map of the environment at least partially based on the path.

In some examples, the portable electronic device can be a smart phone or smart watch and the map can be a topological map of a residential dwelling. The sensor can detect a first location of the portable electronic device within an environment at a first instance of time. The sensor can detect a second location of the portable electronic device within the environment at a second instance of time. The movement of the portable electronic device can be based on the first location and the second location. The sensor can include an accelerometer, a gyroscope a Global Positioning System (GPS) sensor, a magnetometer, or a Near-Field Communication (NFC) sensor. The sensor can be a first sensor and the portable electronic device can include a second sensor. The processor can be configured to combine first data from the first sensor and second data from the second sensor using information fusion techniques. The map of the environment can be a topological map. The map of the environment can include characteristics representative of an indoor environment.

The processor can be configured to passively generate the path. The processor can be configured to generate the map at least partially using machine learning techniques. The generation of the map using the machine learning techniques can include at least one of: correlating a duration of time the portable electronic device remains in a single location of the environment with a probable configuration of the map, correlating a time of day the portable electronic device moves along a segment of the path with a probable configuration of the map, correlating a proximity of one or more other electronic devices disposed within the environment with a probable configuration of the map, correlating a geographic location of the environment with a probable configuration of the map, and correlating an estimated activity at a location within the environment with a probable configuration of the map. The estimated activity determined by the exemplary process can be at least partially based on the movement detected by the sensor. The portable electronic device can be a smart phone, a smart watch, or a tablet computing device.

Another aspect of the present disclosure relates to a method for mapping an environment. The method includes detecting movement of a portable electronic device within the environment. The method includes generating a path based on the detected movement. The method includes estimating, using machine learning, a probable configuration of the environment at least partially based on the path. The method can include generating a map of the environment based at least partially on the probable configuration.

In some examples, the method can further include detecting movement of a second portable electronic device within the environment, communicating the detected movement of the second portable electronic device to the first portable electronic device, and generating the path based on the detected movements of the first portable electronic device and the second portable electronic device. The detected movement of the portable electronic device can be relative to a stationary electronic device disposed within the environment. The stationary electronic device can be communicatively coupled to the portable electronic device. The map can depict an indoor environment including two or more rooms.

BRIEF DESCRIPTION OF THE DRAWINGS

The disclosure will be readily understood by the following detailed description in conjunction with the accompanying drawings, wherein like reference numerals designate like structural elements, and in which.

DETAILED DESCRIPTION

Figure 1A:
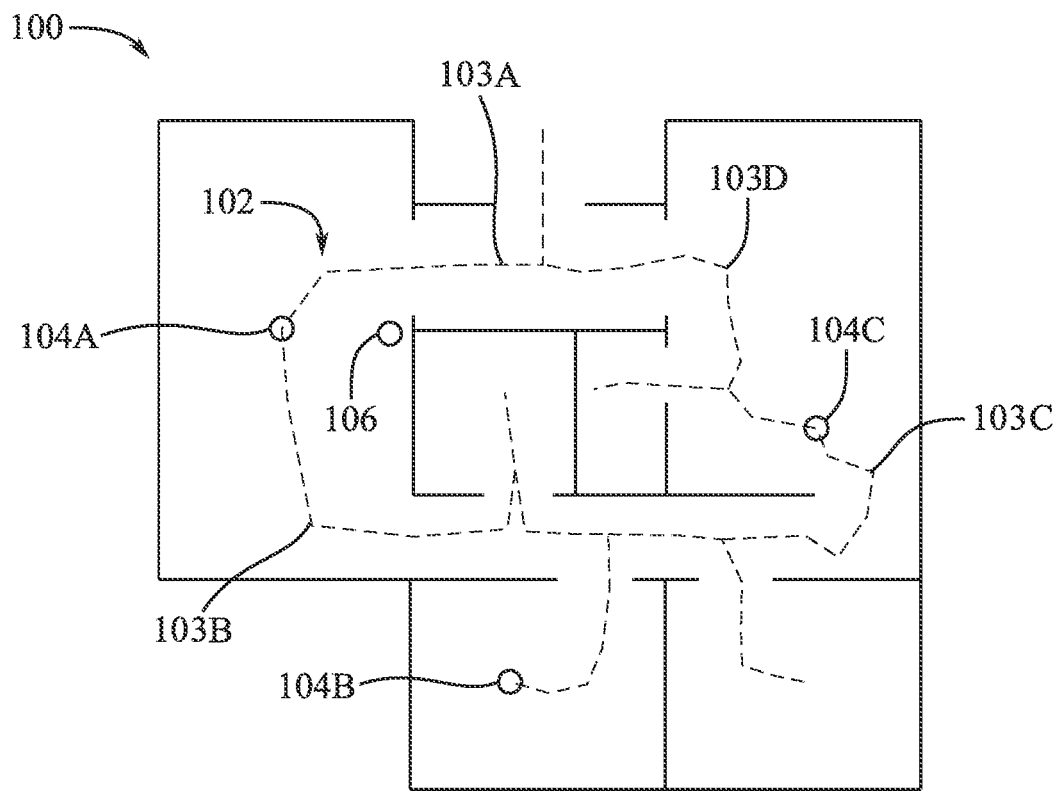
FIG. 1A shows a top view of an environment.

Reference will now be made in detail to representative embodiments illustrated in the accompanying drawings. It should be understood that the following descriptions are not intended to limit the embodiments to one preferred embodiment. To the contrary, it is intended to cover alternatives, modifications, and equivalents as can be included within the spirit and scope of the described embodiments, as defined by the appended claims.

One aspect of the following disclosure relates to mapping an environment using one or more electronic devices. In some examples, the one or more electronic devices can be used to collect data relative to movement of the electronic device within the environment. Additionally, or alternatively, the one or more electronic devices can be used to collect data relative to locations of the electronic device within the environment over a duration of time. For example, a sensor can detect a first location of the electronic device within the environment at a first instance of time and subsequently detect a second location of the electronic device within the environment at a second instance of time. Additionally, or alternatively, the electronic device can collect position data relative to the device itself, such as, detecting a direction and velocity the electronic device was carried over a duration of time. This data may not directly correlate with the environment, but simply correlate to the electronic device's own traveled path. This data can be subsequently correlated with the environment.

The data can be analyzed, processed, or otherwise relied on to generate a path along which one or more of the electronic devices were carried (e.g., by a user) or located at instances of time over the duration of time. The path and attributes related to the environment can be analyzed (e.g., using machine learning techniques) and a topological or other type of map of the environment can be generated based at least in part on the path. The attributes can include locations within the environment, such as, couch, bedroom, bathroom, door, another attribute, or a combination thereof. In some examples, the path can represent a relative spatial connection or route existing between the attributes of the environment.

In some examples, a user of a portable electronic device can carry the portable electronic device around an environment during the user's daily routine or everyday activities (e.g., making breakfast, sleeping, working, exercising, caring for dependents, other activities, or a combination thereof). While transitioning through the environment, a sensor or other component within the portable electronic device can passively detect a position or movement characteristic of the portable electronic device, such as, an acceleration, speed, velocity, direction of movement, a heading, a combination thereof, or another movement characteristic. In some examples, the environment can be an apartment, a home, an office building, a rental property, another type of indoor environment, or any other environment. The generated map can include characterizations or symbolic representations of portions of the environment, such as, bedrooms, hallways, kitchens, offices, stairs, etc. In some examples, the path or map can be generated passively while the user undertakes daily activities. In other words, the path and/or the map can be generated automatically without requiring the user to actively input room types and the environment's layout into the portable electronic device or another electronic device.

Aspects of the present disclosure can relate to methods for mapping an environment. Some example methods include detecting movement or a location of a portable electronic device within the environment and generating a path based on the detected movement or position. The method can also include estimating, using machine learning techniques, a probable configuration of a map of the environment. For example, if the environment were a residential dwelling, the machine learning can consider the date the residential dwelling was constructed and/or floorplans of surrounding dwellings. This is just one non-limiting example of the type of information that can be considered or relied on when generating a map of the environment.

Mapping an environment based on movement or location data from one or more portable electronic devices can be beneficial to occupants of the environment. For example, the map can be transferred or communicated to a home automation system capable of implementing user instructions based on the particular location of the user and the type of room the user is occupying. As such, the map can be relied on by the home automation system when a user requests lights to be turned on without the user having to specify which room is being occupied. For example, data collected by one or more electronic devices can suggest the occupant commonly or repeatedly occupies a particular portion of the environment on particular days of the week and at a particular time (e.g., occupying a living room to stream a television show during the evening).

In some examples, the one or more portable electronic devices can be communicatively coupled (i.e., capable of wirelessly communication) to one or more stationary electronic devices within the environment. As such, the movement or location/position data collected by the one or more portable electronic devices can relate or otherwise correlate to a location of the one or more stationary electronic devices. For example, the data can include a series of distances between the portable electronic device and the stationary electronic device at multiple instances of time over a duration of time. Additionally, or alternatively, the data can include a series of velocities (speed and direction) the portable electronic device moved relative to the stationary electronic device over a duration of time.

A map generated based on aspects of the present disclosure can be any representation of any environment including one or more attributes of the environment, such as, paths, routes, symbols, markers, objects, boundaries, barriers, other attributes of the environment or a combination thereof. The map can represent indoor environments, outdoor environments, or a combination thereof. In some examples, the map can substantially resemble the environment (i.e., include illustrations of geological features, furniture, windows, doorways, stairs, walls, fences, or any other object present in the environment). In other examples, the map may not visually resemble the environment but include one or more symbols which form an abstract representation of the environment (e.g., a topological map lacking ancillary details of the environment) including lines, shapes, or other symbols representing attributes of the environment.

These and other embodiments are discussed below with reference to FIGS. 1A-5. However, those skilled in the art will readily appreciate that the detailed description given herein with respect to these Figures is for explanatory purposes only and should not be construed as limiting. Furthermore, as used herein, a system, a method, an article, a component, a feature, or a sub-feature including at least one of a first option, a second option, or a third option should be understood as referring to a system, a method, an article, a component, a feature, or a sub-feature that can include one of each listed option (e.g., only one of the first option, only one of the second option, or only one of the third option), multiple of a single listed option (e.g., two or more of the first option), two options simultaneously (e.g., one of the first option and one of the second option), or combination thereof (e.g., two of the first option and one of the second option).

FIG. 1A shows a top view of an environment 100. The environment 100 can be an apartment, a house, an office building, a rental property, another type of indoor environment, or any other environment. FIG. 1A also shows a path 102 extending through various rooms and hallways of the environment 100. The path 102 can represent a footpath or route correlating to movement or a positon of one or more portable electronic devices 104A-104C carried by one or more occupants (not shown) within the environment 100. In other words, the path 102 can be an amalgamation of routes (e.g., 103A-103D) one or more portable electronic devices 104A-104C have been carried or transported within the environment 100. The portable electronic devices 104A-104C can be any type of electronic device, such as, one or more smart watches, smart phones, tablet computing devices, or other portable electronic device. The one or more portable electronic devices 104A-104C can include one or more sensors configured to collect data associated with or correlating to the location/movement of the portable electronic device 104A-104C within the environment 100. This data can be utilized to generate the path 102. The one or more sensors will be further described herein with reference to FIG. 2.

In some examples, the movement and/or location(s) of the one or more portable electronic devices 104A-104C within the environment 100 can be detected relative to a fixed point or position within the environment 100. For example, an electronic device 106 can be disposed within the environment 100 and the one or more portable electronic devices 104A-104C can be communicatively coupled to the electronic device 106, such that, the movement or location(s) of the portable electronic device(s) 104A-104C is detected relative to the electronic device 106 to generate the path 102. In some examples, the electronic device 106 can be stationary or temporarily stationary within the environment 100, such as, a smart speaker or electronic assistant-type device.

Additionally, or alternatively, a first portable electronic device 104A can be communicatively coupled with a second portable electronic device 104B such that each of the portable electronic devices 104A-104C share or transfer the movement and/or location data utilized to generate the path 102. The path 102 can be generated by the one or more portable electronic devices 104A-104C, the electronic device 106, a cloud computing system, a combination thereof, or any other device communicatively coupled to one or more of the portable electronic devices 104A-104C. The data can include a series of distances between the portable electronic device(s) 104A-104C and the stationary electronic device 106 over a duration of time. For example, a sensor can detect a first location of the portable electronic device 104A within the environment 100 at a first instance of time and subsequently detect a second location of the portable electronic device 104A within the environment 100 at a second instance of time. Additionally, or alternatively, the data can include a series of velocities (speed and direction) one or more of the portable electronic device 104A-104C moved relative to the stationary electronic device 106 over a duration of time.

Figure 1B:
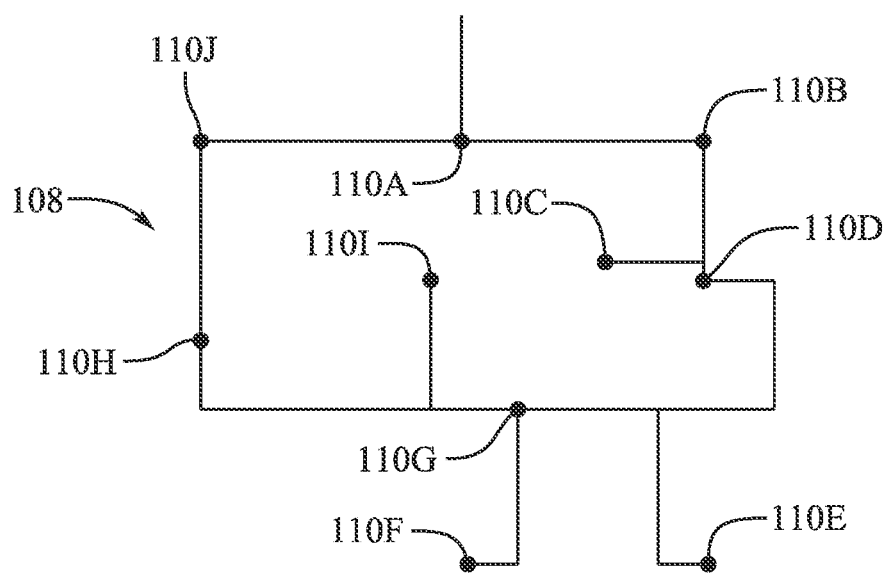
FIG. 1B shows a top view of a map correlating with the environment shown in FIG. 1A.

FIG. 1B shows a top view of a map 108 correlating with the path 102 and the environment 100 shown in FIG. 1A. In some examples, the one or more portable electronic devices 104A-104C, the electronic device 106, or a combination thereof can generate the map 108 at least partially based on the path 102. Additionally, or alternatively, an off-site electronic device (e.g., cloud computing) communicatively coupled to one or both of the electronic device 106 or one or more portable electronic devices 104A-104C can generate the map 108 at least partially based on the path 102. In some examples, the map 108 can be topological (as shown in FIG. 1B) or otherwise formed as a simplified diagram lacking explicit details of the environment 100 (e.g., detailed room dimensions, furniture, doorways, windows, etc.). Rather, in some examples, the map 108 can form a simple diagram including lines (e.g., representing one or more pathways) linking geometric shapes (e.g., representing rooms or other characteristics of the environment 100).

In some examples, the map 108 can include a symbolic representation of the environment including any number of symbols 110A-110J representing different portions or areas within the environment 100 (i.e., characteristics representative of an indoor environment). For example, the environment 100 can be a house and a first symbol 110A can represent an entry way, a second symbol 110B can represent a dining room, and a third symbol 110C can represent a pantry. The remaining symbols 110D-110J can represent other rooms or hallways within the environment 100, such as, one or more bedrooms, bathrooms, living rooms, family rooms, offices, exercise rooms, closets, etc. In some examples, a ratio of the distance or spacing between the symbols 110A-110J can accurately depict a ratio of the distance or spacing between rooms within the actual environment 100. For example, a first pathway in the environment 100 that is twenty feet long can be shown on the map 108 (e.g., as a line between two symbols) as twice the length of a second pathway in the environment 100 that is ten feet long. That is, a ratio (comparative distances between symbols 110A-110J) shown on the path 102 and the map 108 can match or substantially match a ratio of the actual distances between pathways, routes, and rooms of the environment 100. In some examples, the distance or spacing between the symbols 110A-110J do not accurately depict a ratio of the distance or spacing between rooms within the actual environment 100. That is, the ratio (comparative distances between symbols 110A-110J) shown on the path 102 and the map 108 do not match or substantially match a ratio of the actual distances between pathways, routes, and rooms of the environment 100.

Any number or variety of components in any of the configurations described herein can be included in the electronic devices. The components can include any combination of the features described herein and can be arranged in any of the various configurations described herein. The components of an electronic device configured to generate a map using one or more sensors described herein can apply not only to the specific examples discussed herein, but to any number of examples in any combination. Examples of electronic devices are described below, with reference to FIG. 2.

Figure 2:
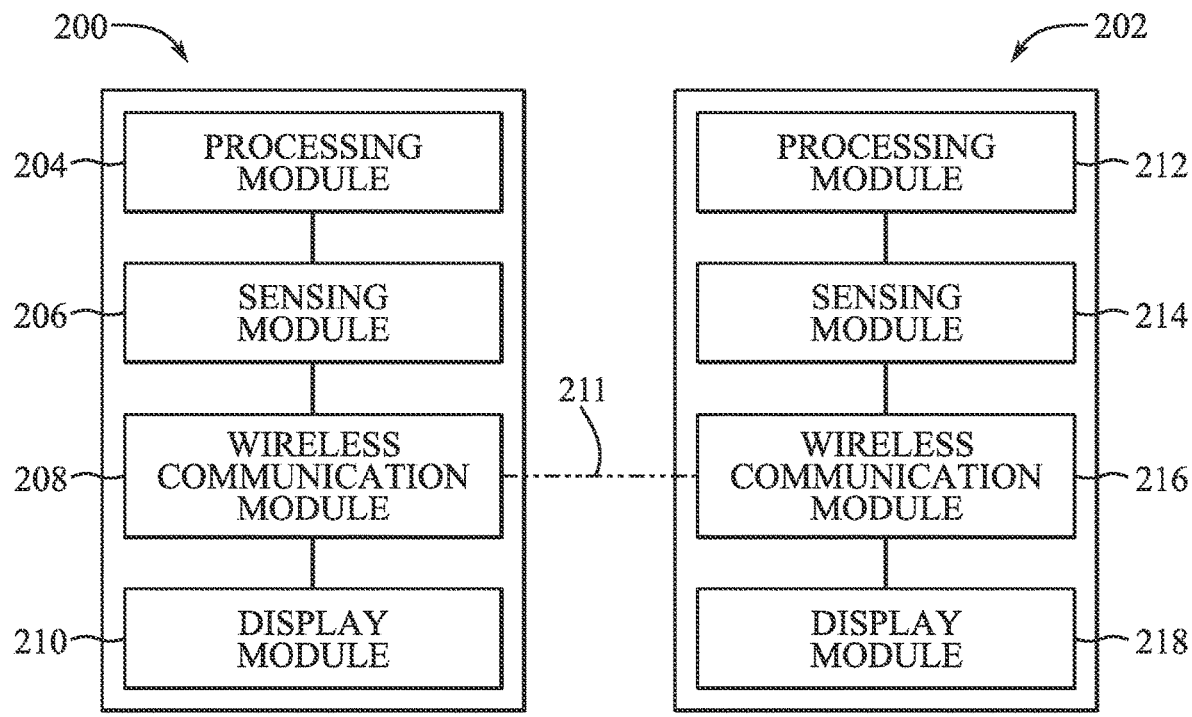
FIG. 2 shows respective block diagrams of electronic devices.

FIG. 2 shows respective block diagrams of a first electronic device 200 and a second electronic device 202. The first electronic device 200 can include a processing module 204, a sensing module 206, a wireless communication module 208, and a display module 210. The processing module 204 can include a processor and a memory. The memory may store a plurality of instructions executable by the processor, such as in hardware, firmware, or software format. In some examples, the processing module 204 can store and process data collected by the sensing module 206 to generate a path (e.g., path 102) and/or a map (e.g., map 108) of an environment (e.g., environment 100).

In some examples, the processing module 204 can undertake or use machine learning techniques (e.g., regression, classification, clustering, decision trees neural networks, etc.) to generate the path and/or map of the environment. The machine learning techniques can consider or otherwise rely on one or more correlations, such as: correlating a duration of time the first electronic device 200 remains in a single location of the environment with a probable configuration of the map; correlating a time of day the first electronic device 200 moves along a segment of the path with a probable configuration of the map; correlating a proximity of one or more other electronic devices disposed within the environment with a probable configuration of the map; correlating a geographic location of the environment with a probable configuration of the map; correlating an estimated activity being undertaken by the user at a location within the environment with a probable configuration of the map; a combination thereof, or other correlations relating to characteristics of the environment or a movement/position of the first electronic device 200 within the environment. In some examples, data collected by the sensing module 206 can be transmitted to another electronic device (e.g., an off-site server) for processing and generating the map.

The sensing module 206 can include one or more sensors capable of detecting a velocity (i.e., speed in a direction) and/or acceleration of the first electronic device 200, such as, one or more accelerometers, gyroscopes, a Near-Field Communication (NFC) sensor, a Global Positioning System (GPS) sensor, a magnetometer, or combinations thereof. For example, the one or more sensors can collect data representative of a speed and direction the first electronic device 200 is being carried or transported within an environment. The sensing module 206 can include any sensor or combinations of sensors capable of detecting or tracking inertial characteristics of the first electronic device 200, such as, gyroscopes, accelerometers, magnetometers, cameras, magnetometers, a Near-Field Communication (NFC) sensor, a sensor having RF communication and ranging capabilities, a Global Positioning System (GPS) sensor, or a combination thereof. The inertial data of the first electronic device 200 can define data used to generate a path travelled by the first electronic device 200. In some examples, the sensing module 206 can alternatively, or additionally, sense a relative position or location of the first electronic device 200 within the environment at one or more instances of time. The location(s) or position(s) of the first electronic device 200 at the instance(s) of time can define data used to generate the path travelled by the first electronic device 200. For example, the sensing module 206 can include one or more Global Positioning System (GPS) sensors (e.g., receivers with antennas using satellite-based navigation) to determine the first electronic device's 200 position, location, velocity, or a combination thereof. Additionally, or alternatively, the sensing module 206 can detect a first location of the first electronic device 200 within the environment at a first instance of time and subsequently detect a second location of the first electronic device 200 within the environment at a second instance of time. The processing module 204 can generate a path based on the first and second locations and generate a map of the environment based at least partially on the path.

In some examples, the sensing module 206 can include a first sensor or a first set of sensors, and a second sensor or a second set of sensors. The processing module 204 can combine first data from the first sensor or first set of sensors and second data from the second sensor or second set of sensors using information fusion techniques. For example, the processing module 204 can implement sensor fusion or multi-sensor data fusion to combine the first and second data such that the resulting path is more accurate, dependable, or complete than would be possible if the first and second data were utilized individually. In some examples, data collected or detected by sensors disposed on different electronic devices (e.g., first electronic device 200 and second electronic device 202) can be combined using information fusion techniques to generate a path.

The wireless communication module 208 can include one or more wireless antennas that can be in electrical communication with one or more other components of the first electronic device 200. In some examples, one or more antennas can receive and/or transmit wireless signals at one or more frequencies and can be, for example, one or more of a cellular antenna such as an LTE antenna, a Wi-Fi antenna, a Bluetooth antenna, a Global Positioning System (GPS) antenna, an Near Field Communication (NFC) antenna, a multi-frequency antenna, an Ultra-Wideband (UWB) antenna, and the like. In some examples, the antenna or antennas within the wireless communication module 208 can be communicatively coupled to one or more other electronic devices (e.g., the second electronic device 202, a router, a smart speaker, an electronic assistant-type device, a combination thereof, or any other electronic device). This wireless communication functionality is depicted in FIG. 2 as the broken line 211. In some examples, position/location and/or movement data detected by the sensing module 206 can be communicated to the wireless communication module 208 and can be transmitted to the one or more other electronic devices. In some examples, the same system that is used for wireless communication (e.g. wireless communication module 208) can also be utilized as the sensing module 206 or in conjunction with the sensing module 206 to, for example, collect data representative of a speed and direction the first electronic device 200 is being carried or transported within an environment.

The display module 210 can include a cover including a transparent material, such as plastic, glass, and/or ceramic. The display module 210 can also include a display stack or display assembly that can include multiple layers and components, each of which can perform one or more desired functions. For example, the display assembly can include a touch detection layer or component and a force sensitive layer or component. In some examples, the first electronic device 200 can passively or automatically generate the path (e.g., path 102) and/or the map (e.g., map 108), however, in other examples, a user can manually cause the first electronic device 200 to undertake a process to generate the path and/or the map (see FIG. 5) by inputting commands on the touch detecting layer. The display module 210 can also include one or more display panels or components that can include one or more pixels and/or light emitting portions to display visual content and/or information to a user. In some examples, one or more of the layers can include a liquid crystal display (LCD), a light emitting diode (LED) display, an organic light emitting diode (OLED) display, and/or any other form of display. The display assembly can also include one or more electrical connectors to provide signals and/or power to the display panel from other components of the display module 210 or the first electronic device 200.

The second electronic device 202 can include a processing module 212, a sensing module 214, a wireless communication module 216, and a display module 218. The processing module 212 can include a processor and a memory. The memory can store a plurality of instructions executable by the processor, such as in hardware, firmware, or software format. In some examples, the processing module 212 can store and process data collected by the sensing module 214 to generate a path (e.g., path 102) and/or a map (e.g., map 108) of the environment (e.g., environment 100).

In some examples, the processing module 212 can undertake or use machine learning techniques (e.g., regression, classification, clustering, decision trees neural networks, etc.) to generate the path and/or map of the environment. The machine learning techniques can consider or otherwise rely on one or more correlations, such as: correlating a duration of time the second electronic device 202 remains in a single location of the environment with a probable configuration of the map; correlating a time of day the second electronic device 202 moves along a segment of the path with a probable configuration of the map; correlating a proximity of one or more other electronic devices disposed within the environment with a probable configuration of the map; correlating a geographic location of the environment with a probable configuration of the map; correlating an estimated activity being undertaken by the user at a location within the environment with a probable configuration of the map; a combination thereof, or other correlations relating to characteristics of the environment or movement/position of the second electronic device 202 within the environment.

The sensing module 214 can include one or more sensors capable of detecting a velocity (i.e., speed in a direction) and/or acceleration of the second electronic device 202, such as, one or more accelerometers, gyroscopes, a Near-Field Communication (NFC) sensor, a Global Positioning System (GPS) sensor, or combinations thereof. For example, the one or more sensors can collect data representative of a speed and direction the second electronic device 202 is being carried or transported within an environment. The sensing module 214 can include any sensor or combinations of sensors capable of detecting or tracking inertial characteristics of the second electronic device 202, such as, gyroscopes, accelerometers, cameras, magnetometers, a Near-Field Communication (NFC) sensor, a Global Positioning System (GPS) sensor, or a combination thereof. The inertial data of the second electronic device 202 can define data used to generate a path travelled by the second electronic device 202. In some examples, the sensing module 214 can alternatively, or additionally, sense a relative position or location of the second electronic device 202 at one or more instances of time. The location(s) or position(s) of the second electronic device 202 at the instance(s) of time can define data used to generate a path travelled by the second electronic device 202. For example, the sensing module 214 can include one or more GPS sensors (e.g., receivers with antennas using satellite-based navigation) to determine the second electronic device's 202 position, location, velocity, or a combination thereof. Additionally, or alternatively, the sensing module 214 can detect a first location of the second electronic device 202 within the environment at a first instance of time and subsequently detect a second location of the second electronic device 202 within the environment at a second instance of time. The processing module 212 can generate a path based on the first and second locations and generate a map of the environment based at least partially on the path.

In some examples, the sensing module 214 can include a first sensor or a first set of sensors and a second sensor or a second set of sensors. The processing module 212 can combine first data from the first sensor or first set of sensors and second data from the second sensor or second set of sensors using information fusion techniques. For example, the processing module 212 can implement sensor fusion or multi-sensor data fusion to combine the first and second data such that the resulting path is more accurate, dependable, or complete than would be possible if the first and second data were utilized individually. In some example, data collected or detected by sensors disposed on different electronic devices (e.g., first electronic device 200 and second electronic device 202) can be combined using information fusion techniques to generate a path.

The wireless communication module 216 can include one or more wireless antennas that can be in electrical communication with one or more other components of the second electronic device 202. In some examples, one or more antennas can receive and/or transmit wireless signals at one or more frequencies and can be, for example, one or more of a cellular antenna such as an LTE antenna, a Wi-Fi antenna, a Bluetooth antenna, a Global Positioning System (GPS) antenna, an Near Field Communication (NFC) antenna, a multi-frequency antenna, an Ultra-Wideband (UWB) antenna, and the like. In some examples, the antenna or antennas within the wireless communication module 216 can be communicatively coupled to one or more other electronic devices (e.g., the first electronic device 200, a router, a smart speaker, an electronic assistant-type device, a combination thereof, or any other electronic device). In some examples, position/location data and/or movement data detected by the sensing module 214 can be communicated to the wireless communication module 216 and transmitted to the one or more other electronic devices. For example, position/location data and/or movement data detected by the sensing module 214 can be communicated to the wireless communication module 216 and transmitted to the first electronic device 200 through an Ultra-Wideband (UWB) antenna. Correspondingly, the first electronic device 200 can receive the transmission (e.g., with the wireless communication module 208) and process (e.g., with the processing module 204) and generate a map.

The display module 218 can include a cover including a transparent material, such as plastic, glass, and/or ceramic. The display module 218 can also include a display stack or display assembly that can include multiple layers and components, each of which can perform one or more desired functions. For example, the display assembly can include a touch detection layer or component, a force sensitive layer or component. In some examples, the second electronic device 202 can passively or automatically generate the path (e.g., path 102) and/or map (e.g., map 108), however, in other examples, a user can cause the second electronic device 202 to undertake a process to generate the path and/or the map (see FIG. 5) by inputting commands on the touch detecting layer. The display module 218 can also include one or more display panels or components that can include one or more pixels and/or light emitting portions to display visual content and/or information to a user. In some examples, one or more of the layers can include a liquid crystal display (LCD), a light emitting diode (LED) display, an organic light emitting diode (OLED) display, and/or any other form of display. The display module 218 can also include one or more electrical connectors to provide signals and/or power to the display panel from other components of the display module 218 or the second electronic device 202.

In some examples, the first electronic device 200 can be portable while the second electronic device 202 can be portable or stationary. For example, the first electronic device 200 can be carried or transported by the user within the environment while the second electronic device 202 remains in a fixed location within the environment. In some examples, movement and/or location detection of the first electronic device 200 can be detected relative to the second electronic device 202. For example, the data collected by the sensing module 206 can include a series of velocities (speed and direction) the first portable electronic device 200 moved relative to the second electronic device 202 over a duration of time. Additionally, or alternatively, the sensing module 206 can detect a first location of the first electronic device 200 within the environment at a first instance of time and subsequently detect a second location of the first electronic device 200 within the environment at a second instance of time. The processing module 204 can generate a path based on the first and second locations and generate a map of the environment based at least partially on the path.

Any number or variety of components in any of the configurations described herein can be included in the electronic devices. The components can include any combination of the features described herein and can be arranged in any of the various configurations described herein. The components of an electronic device configured to generate a map using one or more sensors described herein can apply not only to the specific examples discussed herein, but to any number of examples in any combination. Examples of detecting paths using multiple electronic devices and generating a map at least partially based on the multiple paths are described below, with reference to FIGS. 3A-3D.

Figure 3A:
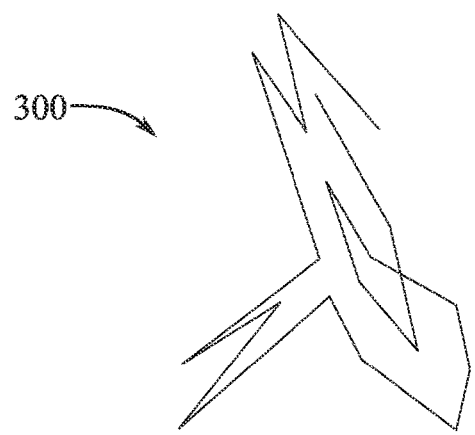
FIG. 3A shows a top view of a first path correlating to movement of an electronic device carried by a user.

FIG. 3A shows a first path 300 correlating to movement of an electronic device carried or transported within an environment by a user. The first path 300 can be generated based on data collected by one or more sensors within the electronic device. The one or more sensors can detect inertial characteristics of the electronic device, such as, a velocity, acceleration, heading, angular position, a combination thereof, or other inertial characteristic. For example, the one or more sensors can collect data representative of speeds and associated directions the electronic device is being carried or transported within an environment to generate the first path 300. The electronic device can include any sensor or combinations of sensors capable of detecting or tracking inertial characteristics of the electronic device, such as, gyroscopes, accelerometers, cameras, magnetometers, a Near-Field Communication (NFC) sensor, a Global Positioning System (GPS) sensor, another RF system, such as, WIFI, Bluetooth, or UWB, or a combination thereof.

Additionally, or alternatively, the one or more sensors can detect a relative position or location of the electronic device within the environment at one or more instances of time. The location(s) or position(s) of the electronic device at the instance(s) of time can define the data used to generate the first path 300 travelled by the electronic device. For example, the one or more sensors can include one or more Global Positioning System (GPS) sensors (e.g., receivers with antennas using satellite-based navigation) to determine the electronic device's position, location, velocity, or a combination thereof.

In some examples, the positon/location and/or movement of the electronic device that defines the first path 300 can be detected relative to a stationary electronic device. For example, a stationary or temporarily stationary electronic device can be communicatively coupled to the portable electronic device being transported by the user. The stationary electronic device and/or the portable electronic device can detect a change in proximity between the devices to determine a position or velocity of the portable electronic device relative to the stationary electronic device.

Figure 3B:
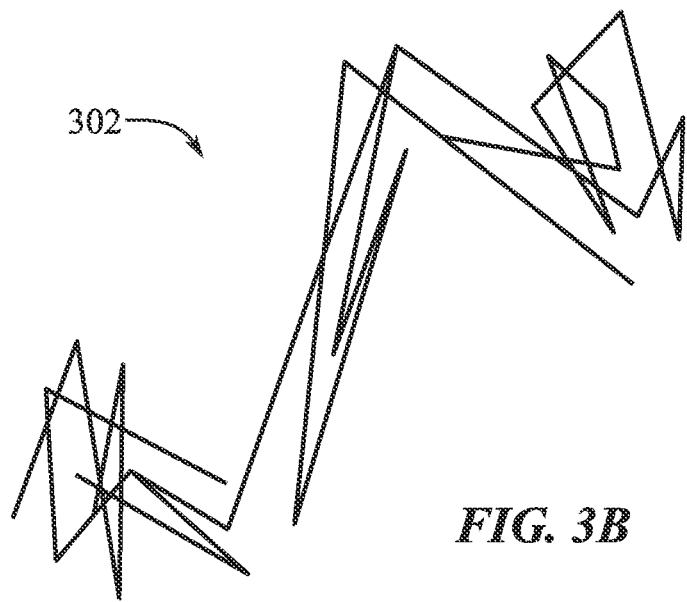
FIG. 3B shows a top view of a second path correlating to movement of an electronic device carried by a user.

FIG. 3B shows a second path 302 correlating to movement of an electronic device carried or transported within an environment by a user. The electronic device can be the same electronic device associated with the first path 300 or a different electronic device. The second path 302 can be generated based on data collected by one or more sensors within the electronic device. The one or more sensors can detect inertial characteristics of the electronic device, such as, a velocity, acceleration, angular position, a combination thereof, or other inertial characteristic. For example, the one or more sensors can collect data representative of speeds and associated directions the electronic device is being carried or transported within an environment to generate the second path 302. The electronic device can include any sensor or combinations of sensors capable of detecting or tracking inertial characteristics of the electronic device, such as, gyroscopes, accelerometers, cameras, magnetometers, a Near-Field Communication (NFC) sensor, a Global Positioning System (GPS) sensor, or a combination thereof.

Additionally, or alternatively, the one or more sensors can detect a relative position or location of the electronic device within the environment at one or more instances of time. The location(s) or position(s) of the electronic device at the instance(s) of time can define the data used to generate the second path 302 travelled by the electronic device. For example, the one or more sensors can include one or more Global Positioning System (GPS) sensors (e.g., receivers with antennas using satellite-based navigation) to determine the electronic device's position, location, velocity, or a combination thereof.

In some examples, the positon/location and/or movement of the electronic device that defines the second path 302 can be detected relative to a stationary electronic device. For example, a stationary or temporarily stationary electronic device can be communicatively coupled to the portable electronic device being transported by the user. The stationary electronic device and/or the portable electronic device can detect a change in proximity between the devices to determine a position or velocity of the portable electronic device relative to the stationary electronic device.

Figure 3C:
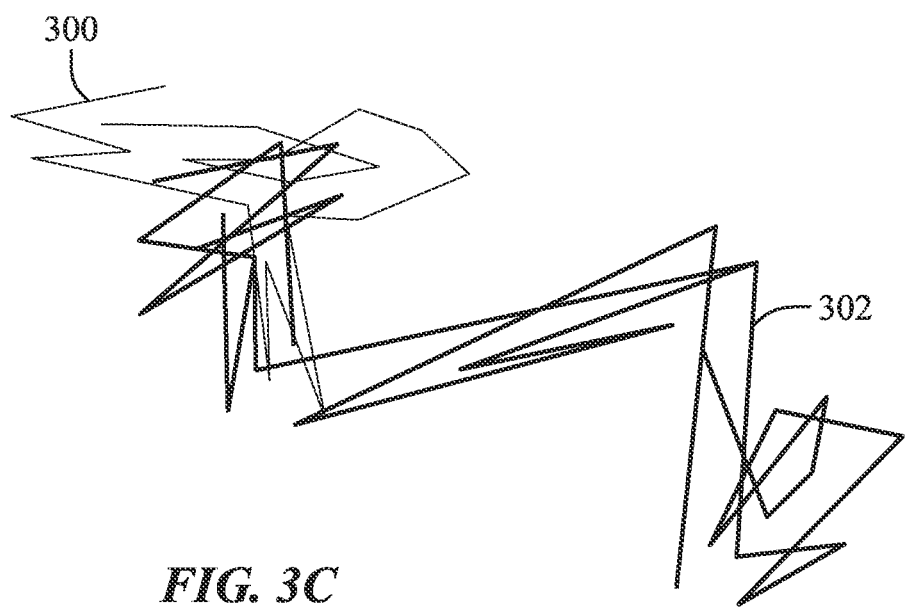
FIG. 3C shows a top view of the first and second paths overlaid.

FIG. 3C shows a top view of the first path 300 overlaid onto the second path 302. Each of the first path 300 and the second path 302 can be formed or defined by multiple data points. The data points can be associated with or placed relative to a coordinate system. However, in some examples, the first path 300 can correlate to a different coordinate system than the second path 302. That is, each of the first and second paths 300, 302 can be formed as independent arbitrary-axis piece-wise spatial paths which are subsequently combined or overlaid. The first path 300 can be overlaid relative to the second path 302 in an accurate orientation based on matching similar attributes (e.g., shapes, angles, crossings, etc.) of the paths 300, 302. Additionally, or alternatively, each of the first and second paths 300, 302 can be associated with a common point or coordinate to orient, align, and overlay the first and second paths 300, 302. For example, a stationary electronic device can communicate its coordinate or location relative to the electronic device or devices transported or carried to generate the first and second paths 300, 302. Thereafter, the coordinate or location of the stationary electronic device can be used to orient, align, and overlay the first and second paths 300, 302. While FIG. 3C only depicts first and second paths, in other examples, more than two paths can be overlaid, such as, between three and five paths, between six and ten paths, or more than ten paths.

In some examples, the first path 300 can be overlaid onto the second path 302 (or vice versa) by the electronic device. In some examples, the first path 300 can be associated with a first electronic device and the second path 302 can be associated with a second electronic device. The first electronic device can receive data (via wireless communication) from the second electronic device and thereafter overlay the first and second paths 300, 302. Alternatively, or additionally, the second electronic device can receive data (via wireless communication) from the first electronic device and thereafter overlay the first and second paths 300, 302. In some examples, one or both of the first and second electronic devices can transmit their respective movement and/or location data to an off-site electronic device (e.g., servers) which performs the overlay and transmits the overlaid data back to one or both of the first and second electronic devices.

Figure 3D:
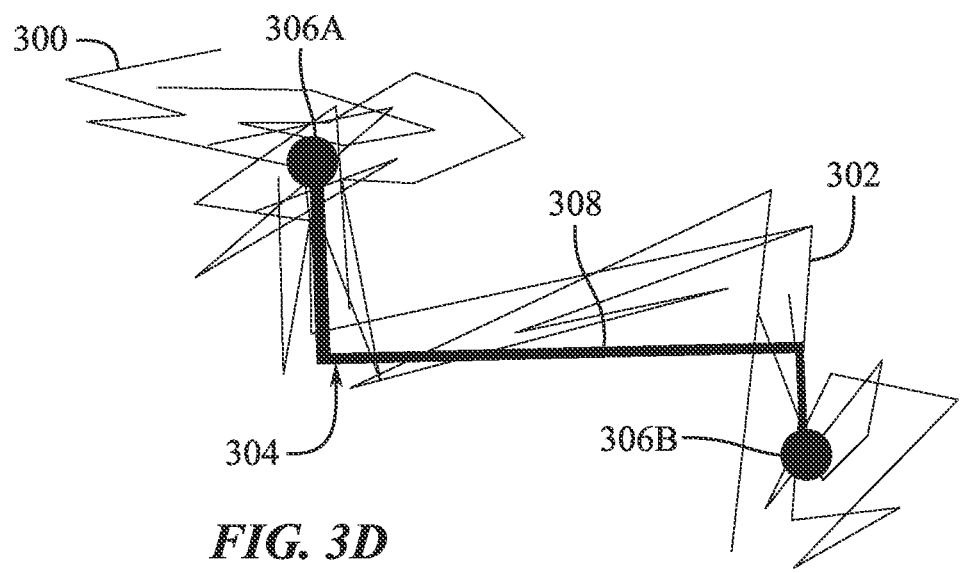
FIG. 3D shows the overlaid first and second paths with an overlaid map.

FIG. 3D shows a map 304 generated relative to the overlaid first and second paths 300, 302. The map 304 can be generated at least partially based on the first and second paths 300, 302. For example, the map 304 can be generated to overlay the average position of data points along the first and second paths 300, 302. The map 304 can include one or more characteristics representative of an indoor environment, such as, symbols 306A, 306B representing different portions or areas of the environment. For example, the environment can be an indoor environment, such as, an apartment. The first symbol 306A can represent a bedroom and the second symbol 306B can represent a kitchen space. The map 304 can also include one or more lines 308 extending between the one or more symbols 306A, 306B. For example, the line 308 can be representative of a hallway or route commonly relied on by the user to transition from the bedroom (e.g., symbol 306A) to the kitchen space (e.g., symbol 306B).

In some examples, the map 304 can be generated using a processing module of the electronic device. Additionally, or alternatively, the map 304 can also be generated using machine learning techniques. For example, one or more of regression, classification, clustering, decision trees, neural networks, or other machine learning techniques can be used to generate the map 304 of the environment. The machine learning techniques can consider or otherwise rely on one or more characteristics of the environment to generate the map 304. For example, the characteristics of the environment can include a style of the environment (e.g., house, apartment, office, etc.), a logical flow of the environment, an era in which the environment was erected, a location of the environment (e.g., residential neighborhood, industrial park, etc.), or any other characteristic of the environment. Additionally, or alternatively, the machine learning techniques can consider or otherwise rely on one or more predicted activities occurring within the environment to generate the map 304. The predicted activities occurring within the environment can be deduced based on the location and/or movement of one or more electronic devices within the environment. For example, a lack of movement for an extended period of time can suggest the region or portion of the environment is a bedroom. Similarly, two electronic devices (e.g., smart phones) that remain relatively motionless within close proximity to one another for an extended period of time can suggest the region or portion of the environment is a bedroom inhabited by more than one individual.

As another example, repetitive movements around mealtimes can suggest the region or portion of the environment is a kitchen or dining area. Similarly, multiple electronic devices in a single region or portion of the environment around mealtimes can suggest the region or environment is a kitchen or dining area. Moreover, the time of day that an electronic device is transported or stationary can be indicative of the category of room or space within the environment. The machine learning techniques can consider or otherwise rely on one or more of the temporal or inertial characteristics of one or more electronic device within the environment to generate the map 304. In some examples, a user can input or edit names, features, or other attributes of the map 304 prior to generation or after generation. In some examples, the calendars resident on the electronic devices can be used to aid in determining and identifying locations. For example, if a calendar indicates a videoconference is to occur at a certain time and the electronic device is relatively still in a single location for that designated time, the system may surmise that the identified location is a home office.

Any number or variety of components in any of the configurations described herein can be included in the electronic devices. The components can include any combination of the features described herein and can be arranged in any of the various configurations described herein. The components of an electronic device configured to generate a map using one or more sensors described herein can apply not only to the specific examples discussed herein, but to any number of examples in any combination. Examples of generating a map resembling an environment are described below, with reference to FIGS. 4A and 4B.

Figure 4A:
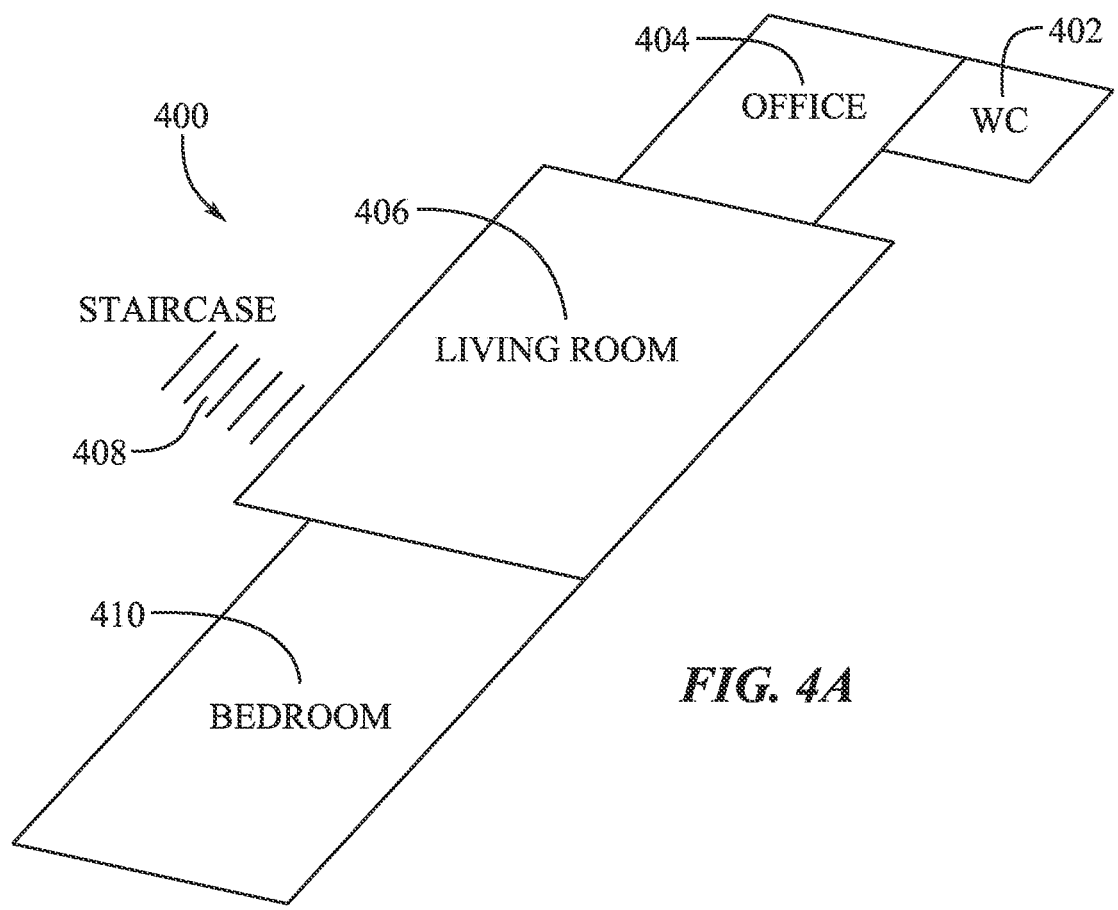
FIG. 4A shows a perspective view of an environment.
Figure 4B:
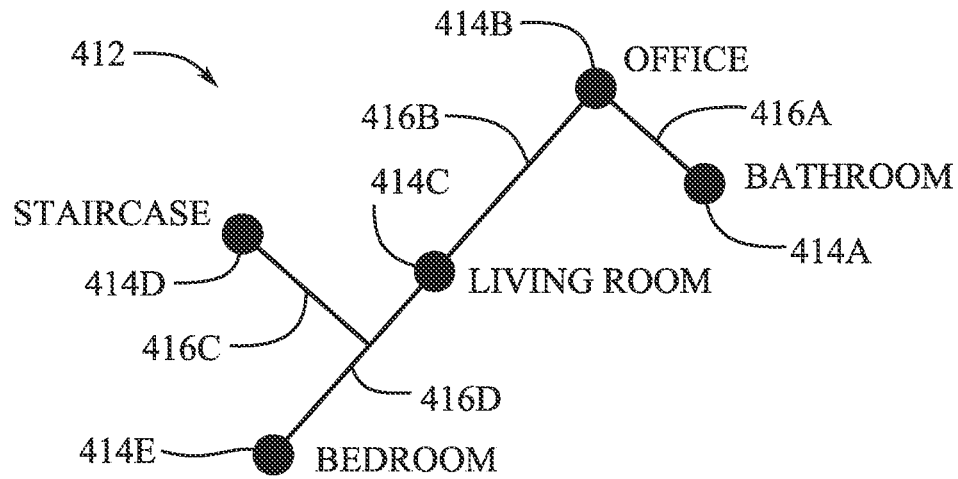
FIG. 4B shows a perspective view of a map correlating with the environment shown in FIG. 4A.

FIG. 4A shows a perspective view of an environment 400 which can be a residential dwelling, such as, an apartment or house that includes a bathroom or water closet 402, an office 404, a living room 406, a staircase 408, and a bedroom 410. FIG. 4B shows a perspective view of a map 412 generated by one or more electronic devices and at least partially based on a path one or more electronic devices were transported or carried along within the environment 400. The map 412 can include one or more symbols 414A-414E representative of each respective room within the environment 400 (e.g., the water closet 402, office 404, living room 406, staircase 408, and the bedroom 410). In some examples, one or more machine learning techniques can be used to determine the type of room(s) within the environment 400 and the layout of the room(s). For example, one or more characteristics of the environment 400 can be relied on including a style of the environment 400 (e.g., house, apartment, office, etc.), a logical flow of the environment 400, an era in which the environment 400 was erected, a location of the environment 400 (e.g., residential neighborhood, industrial park, etc.), or any other characteristic of the environment 400. Additionally, or alternatively, the machine learning techniques can consider or otherwise rely on one or more predicted activities occurring within the environment 400 to generate the map 412. The predicted activities occurring within the environment 400 can be deduced based on the location and/or movement of one or more electronic devices within the environment 400.

Each of the one or more symbols 414A-414E can be interconnected by lines 416A-416D representing pathways or routes between the rooms within the environment 400. In some examples, the distance or spacing between the symbols 414A-414E can accurately depict a distance ratio compared to the actual environment 400. For example, a first pathway (represented by line 416D) in the environment 400 that is fifteen feet long can be depicted as twice the length of a second pathway (represented by line 416A) in the environment 400 that is five feet long. That is, a ratio (comparative distances between symbols 414A-414E) shown on the map 412 can match or substantially match a ratio of the actual distances between pathways, routes, and rooms of the environment 400.

In the example shown in FIG. 4B, the map 412 is a topological map which lacks explicit detail of the environment 100, such as, detailed room dimensions, furniture, doorways, windows, etc. In other examples, the map 412 can include additional detail, such as, detailed room dimensions, furniture, doorways, windows, a combination thereof, or other details of the environment 400. In some examples, the map 412 can display or illustrate a location of one or more electronic devices within the environment 400. For example, the map 412 can include a symbol representative of a set of keys or other object disposed within the environment 400. The set of keys or other object within the environment 400 can include a wireless tracking module capable of transmitting a wireless signal indicative of its location within the environment 400 to one or more electronic devices disposed within the environment 400. In some examples, a user can add fidelity or detail to the map 412, for example, by interacting with an interface on one or more electrical devices. In some examples, the map 412 can be relied on by applications or other electronic devices to perform tasks related to the environment 400. For example, the applications or tasks can relate to home automation functionality, such as, activating or deactivating lights, speakers, cameras, HVAC systems, a combination thereof, or other attributes within a particular room or rooms on the map 412.

Figure 5:
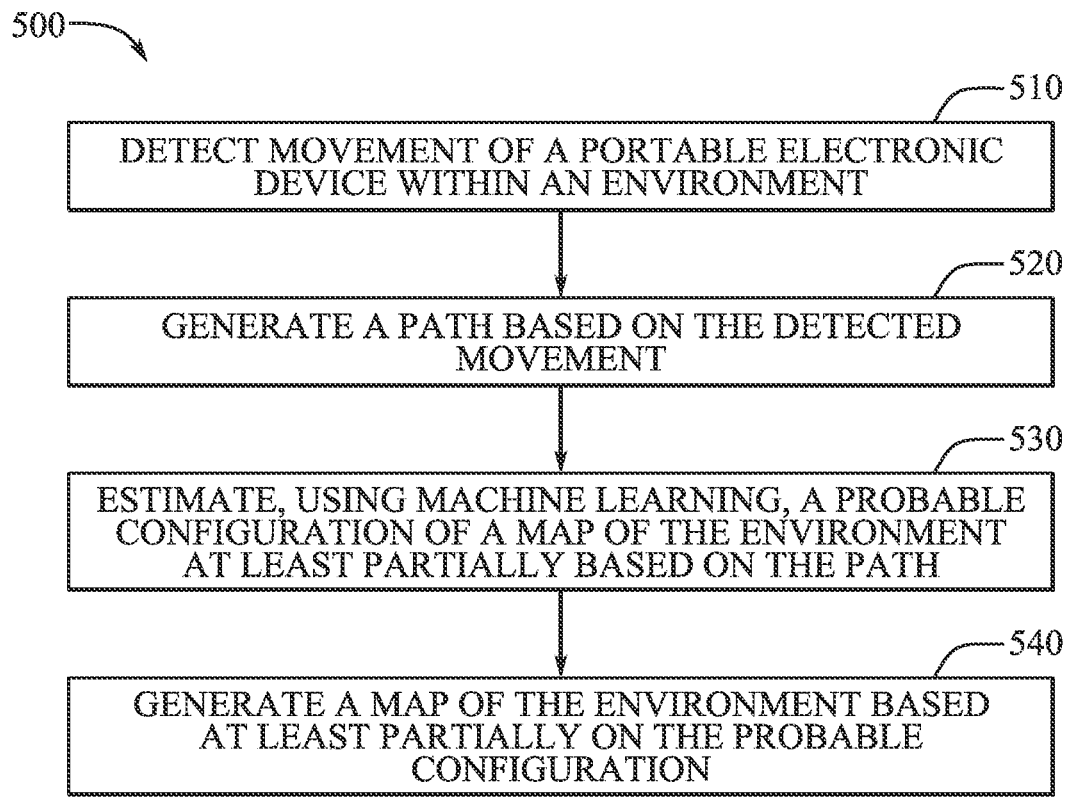
FIG. 5 shows a process flow diagram for mapping an environment.

FIG. 5 shows a process flow diagram of a method 500 for mapping an environment using some aspects of the disclosure. The method 500 includes the act 510 of detecting movement of a portable electronic device within the environment. The method 500 includes the act 520 of generating a path based on the detected movement. The method 500 includes the act 530 of estimating, using machine learning, a probable configuration of a map of the environment at least partially based on the path. The method 500 includes the act 540 of generating a map of the environment based at least partially on the probable configuration.

The method 500 includes the act 510 of detecting movement of a portable electronic device within the environment. In examples, a user of the portable electronic device can carry or transport the portable electronic device throughout the environment during the user's daily routine or everyday activities (e.g., entering/exiting the environment, preparing meals, sleeping, house-hold chores, other activities, or a combination thereof). The portable electronic device can be a smart phone carried in a pocket or bag of a user. In some examples, the portable electronic device can be a smart watch coupled to the wrist of the user. In some examples, the device can be a tablet computing device or laptop transported between various rooms within the environment.

The method 500 includes the act 520 of generating a path based on the detected movement. The portable electronic device can include one or more sensors configured to collect data associated with or correlating to the location/movement of the portable electronic device within the environment. This data can be utilized to generate the path. For example, the one or more sensors can collect data representative of a speed and direction the portable electronic device is being carried or transported within the environment. The one or more sensors can include any individual sensor or combinations of sensors capable of detecting or tracking inertial characteristics of the portable electronic device, such as, gyroscopes, accelerometers, cameras, magnetometers, other sensors, or a combination thereof.

The method 500 includes the act 530 of estimating, using machine learning, a probable configuration of a map of the environment at least partially based on the path. For example, one or more of regression, classification, clustering, decision trees neural networks, or other machine learning techniques can be used to estimate the probable configuration of the map. The machine learning can consider or otherwise rely on one or more characteristics of the environment to estimate the probable configuration of the map. For example, the characteristics of the environment can include a style of the environment (e.g., house, apartment, office, etc.), a logical flow of the environment, an era in which the environment was erected, a location of the environment (e.g., residential neighborhood, industrial park, etc.), or any other characteristic of the environment. Additionally, or alternatively, the machine learning can consider or otherwise rely on one or more predicted activities occurring within the environment to estimate the probable configuration of the map. The predicted activities occurring within the environment can be deduced based on the location and/or movement of one or more electronic devices within the environment. For example, a lack of movement for an extended period of time can suggest the region or portion of the environment is a bedroom. Similarly, two electronic devices (e.g., smart phones) that remain relatively motionless within close proximity to one another can suggest the region or portion of the environment is a bedroom inhabited by more than one individual.

The method 500 includes the act 540 of generating a map of the environment based at least partially on the probable configuration. The map can form a simple diagram including lines (e.g., representing one or more pathways) linking geometric shapes (e.g., representing rooms or other portions of the environment). In some examples, the map can be topological (as shown in FIGS. 1B and 4B) or otherwise formed as a simplified diagram lacking explicit details of the environment (e.g., detailed room dimensions, furniture, doorways, windows, etc.). In some examples, a user can add fidelity or detail to the map, for example, by interacting with an interface on one or more electrical devices.

The method 500 can optionally include the acts of detecting movement of a second portable electronic device within the environment, communicating the detected movement of the second portable electronic device to the first portable electronic device, and generating the path based on the detected movements of the first portable electronic device and the second portable electronic device. In examples, a user of the second portable electronic device can carry or transport the second portable electronic device throughout the environment during the user's daily routine or everyday activities. The second portable electronic device can be any portable electronic device, such as, a smart phone carried by a user or a smart watch coupled to the wrist of the user.

The second portable electronic device can include one or more sensors configured to collect data associated with or correlating to the location/movement of the second portable electronic device within the environment. This data can be utilized to generate the path. For example, the one or more sensors can collect data representative of a speed and direction the second portable electronic device is being carried or transported within the environment. The one or more sensors can include any individual sensor or combinations of sensors capable of detecting or tracking inertial characteristics of the second portable electronic device, such as, gyroscopes, accelerometers, magnetometers, cameras, magnetometers, other sensors, or a combination thereof.

In some examples, the first and/or second portable electronic devices can be communicatively coupled (i.e., capable of wirelessly communication) to one or more stationary electronic devices within the environment. As such, the movement or location/position data collected by the first and/or second portable electronic devices can relate or otherwise correlate to a location of the stationary electronic device. For example, the data can include a series of distances between the first and/or second portable electronic device and the stationary electronic device over a duration of time. Additionally, or alternatively, the data can include a series of velocities (speed and direction) the first and/or second portable electronic devices move relative to the stationary electronic device over a duration of time.

To the extent applicable to the present technology, gathering and use of data available from various sources can be used to improve the delivery to users of invitational content or any other content that may be of interest to them. The present disclosure contemplates that in some instances, this gathered data may include personal information data that uniquely identifies or can be used to contact or locate a specific person. Such personal information data can include demographic data, location-based data, telephone numbers, email addresses, TWITTER® ID's, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, in the case of advertisement delivery services, the present technology can be configured to allow users to select to "opt in" or "opt out" of participation in the collection of personal information data during registration for services or anytime thereafter. In another example, users can select not to provide mood-associated data for targeted content delivery services. In yet another example, users can select to limit the length of time mood-associated data is maintained or entirely prohibit the development of a baseline mood profile. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data. For example, content can be selected and delivered to users by inferring preferences based on non-personal information data or a bare minimum amount of personal information, such as the content being requested by the device associated with a user, other non-personal information available to the content delivery services, or publicly available information.

The foregoing description, for purposes of explanation, used specific nomenclature to provide a thorough understanding of the described embodiments. However, it will be apparent to one skilled in the art that the specific details are not required in order to practice the described embodiments. Thus, the foregoing descriptions of the specific embodiments described herein are presented for purposes of illustration and description. They are not intended to be exhaustive or to limit the embodiments to the precise forms disclosed. It will be apparent to one of ordinary skill in the art that many modifications and variations are possible in view of the above teachings.

What is claimed is:

1. A portable electronic device, comprising:
    a sensor configured to:
        detect a first location of the portable electronic device within an environment at a first time; and
        detect a second location of the portable electronic device within the environment at a second time; and
    a processor configured to:
        generate a path based on the first location and the second location, the path associated with movement of the portable electronic device within the environment; and
        generate a map of the environment in which the electronic device is disposed based at least partially on the path.

2. The portable electronic device of claim 1, wherein:
    the portable electronic device comprises a smart phone or a smart watch; and
    the map comprises a topological map of a residential dwelling including a symbolic representation of a portion of the residential dwelling.

3. The portable electronic device of claim 1, wherein the portable electronic device comprises a first electronic device;
    the portable electronic device further comprising an antenna configured to receive location data from a second electronic device, the path generated by the processor is at least partially based on the location data received from the second electronic device.

4. The portable electronic device of claim 3, wherein the portable electronic device comprises a first portable electronic device and the second electronic device comprises a second portable electronic device disposed within the environment.

5. The portable electronic device of claim 3, wherein the second electronic device comprises a stationary electronic device disposed within the environment.

6. The portable electronic device of claim 1, wherein the processor is configured to generate the map when an input is received from a user of the portable electronic device.

7. The portable electronic device of claim 1, wherein the portable electronic device comprises a smart phone, a smart watch, or a tablet computing device.

8. A portable electronic device, comprising:
    a sensor configured to detect movement of the portable electronic device within an environment; and
    a processor configured to:
        generate a path based on the movement; and
        generate a map of the environment in which the portable electronic device is disposed at least partially based on the path.

9. The portable electronic device of claim 8, wherein:
    the portable electronic device comprises a smart phone or a smart watch;
    the map comprises a topological map of a residential dwelling;
    the sensor detects a first location of the portable electronic device within an environment at a first time;
    the sensor detects a second location of the portable electronic device within the environment at a second time; and
    the movement of the portable electronic device is based on the first location and the second location.

10. The portable electronic device of claim 8, wherein the sensor comprises an accelerometer, a gyroscope, a Global Positioning System (GPS) sensor, a magnetometer, or a sensor having Radio Frequency (RF) communications capability.

11. The portable electronic device of claim 8, wherein:
    the sensor comprises a first sensor;
    the portable electronic device comprises a second sensor; and
    the processor is configured to combine first data from the first sensor and second data from the second sensor using information fusion techniques.

12. The portable electronic device of claim 8, wherein the map of the environment comprises a topological map including characteristics representative of an indoor environment.

13. The portable electronic device of claim 8, wherein the processor is configured to passively generate the path.

14. The portable electronic device of claim 8, wherein the processor is configured to generate the map at least partially using machine learning techniques.

15. The portable electronic device of claim 14, wherein generation of the map using the machine learning techniques comprises at least one of:
    correlating a duration of time the portable electronic device remains in a single location of the environment with a probable configuration of the map;
    correlating a time of day the portable electronic device moves along a segment of the path with a probable configuration of the map;
    correlating a proximity of one or more other electronic devices disposed within the environment with a probable configuration of the map;
    correlating a geographic location of the environment with a probable configuration of the map; and
    correlating an estimated activity at a location within the environment with a probable configuration of the map, the estimated activity determined at least partially based on the movement detected by the sensor.

16. The portable electronic device of claim 8, wherein the portable electronic device comprises a smart phone, a smart watch, or a tablet computing device.

17. A method for mapping an environment, comprising:
    detecting movement of a portable electronic device within the environment;
    generating a path based on the detected movement;
    estimating, using machine learning, a map of the environment at least partially based on the path; and
    generating the map of the environment in which the portable electronic device is disposed based at least partially on the estimated map.

18. The method of claim 17, wherein the portable electronic device comprises a first portable electronic device and the method further comprises:
   detecting movement of a second portable electronic device within the environment;
   communicating the detected movement of the second portable electronic device to the first portable electronic device; and
   generating the path based on the detected movements of the first portable electronic device and the second portable electronic device.

19. The method of claim 17, wherein the detected movement of the portable electronic device is relative to a stationary electronic device disposed within the environment, the stationary electronic device communicatively connected to the portable electronic device.

20. The method of claim 17, wherein the map depicts an indoor environment comprising two rooms within the indoor environment.

* * * * *